US011186985B2

(12) United States Patent
Bess et al.

(10) Patent No.: US 11,186,985 B2
(45) Date of Patent: *Nov. 30, 2021

(54) VAPOR PERMEABLE, WATER RESISTIVE, AIR BARRIER POLYESTER MEMBRANE HAVING A POLYACRYLIC COATING WITH POROUS PRESSURE SENSITIVE ADHESIVE ADDED TO THE REAR SURFACE OF THE MEMBRANE

(71) Applicant: VAPROSHIELD, LLC, Gig Harbor, WA (US)

(72) Inventors: Daniel Bess, Geneva, OH (US); Robert Piecinski, Montville, OH (US); Leland D. Snyder, Gig Harbor, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,299

(22) Filed: May 5, 2015

(65) Prior Publication Data

US 2016/0024782 A1 Jan. 28, 2016

Related U.S. Application Data

(63) Continuation-in-part of application No. 14/121,027, filed on Jul. 22, 2014.

(Continued)

(51) Int. Cl.
*E04B 1/62* (2006.01)
*B32B 7/06* (2019.01)
(Continued)

(52) U.S. Cl.
CPC ............... *E04B 1/625* (2013.01); *B32B 3/00* (2013.01); *B32B 3/26* (2013.01); *B32B 5/00* (2013.01);
(Continued)

(58) Field of Classification Search
CPC ......... B32B 27/36; C09J 7/021; C08K 3/0058
See application file for complete search history.

(56) References Cited

U.S. PATENT DOCUMENTS 2,140,026 A * 12/1938 Murphy .................. B29C 67/24
264/50
3,440,185 A 4/1969 Hanley
(Continued)

FOREIGN PATENT DOCUMENTS

EP 0397554 B1 8/1994
EP 0874099 A2 2/2001
(Continued)

OTHER PUBLICATIONS

Derwent Abstract og JP 2001-3025. See above for date and inventor.*

(Continued)

*Primary Examiner* — Chinessa T. Golden
(74) *Attorney, Agent, or Firm* — Janeway Patent Law, PLLC; John M. Janeway

(57) ABSTRACT

An ultra violet stable polyester membrane with a polyacrylic coating on one side and a coated pressure sensitive adhesive coating on its other side capable of allowing water vapor to pass through it. The pressure sensitive adhesive is formed of a copolymer comprising a backbone of n-butyl acrylate, 2-ethylhexyl acrylate, and vinyl acetate which is mixed with at least one surfactant and emulsified to produce air bubbles which form pores when the copolymer is set with about 80% to about 90% of the pore sizes ranging from about 200 microns to about 300 microns and being uniformly distributed to form a flow path through the pressure sensitive adhesive.

15 Claims, 4 Drawing Sheets

Related U.S. Application Data

(60) Provisional application No. 61/958,161, filed on Jul. 22, 2013.

(51) Int. Cl.

| | | |
|---|---|---|
| *B32B 27/36* | (2006.01) | |
| *C08K 5/00* | (2006.01) | |
| *C08K 3/016* | (2018.01) | |
| *B32B 5/02* | (2006.01) | |
| *B32B 27/06* | (2006.01) | |
| *B32B 27/00* | (2006.01) | |
| *B32B 7/04* | (2019.01) | |
| *B32B 3/26* | (2006.01) | |
| *B32B 7/12* | (2006.01) | |
| *B32B 37/12* | (2006.01) | |
| *B32B 27/30* | (2006.01) | |
| *B32B 3/00* | (2006.01) | |
| *B32B 5/00* | (2006.01) | |
| *B32B 7/00* | (2019.01) | |
| *B32B 7/02* | (2019.01) | |
| *B32B 27/32* | (2006.01) | |
| *E04D 12/00* | (2006.01) | |
| *B32B 27/18* | (2006.01) | |
| *C09J 7/38* | (2018.01) | |
| *B32B 37/24* | (2006.01) | |

(52) U.S. Cl.
CPC ............... *B32B 5/022* (2013.01); *B32B 7/00* (2013.01); *B32B 7/02* (2013.01); *B32B 7/04* (2013.01); *B32B 7/06* (2013.01); *B32B 7/12* (2013.01); *B32B 27/00* (2013.01); *B32B 27/06* (2013.01); *B32B 27/18* (2013.01); *B32B 27/30* (2013.01); *B32B 27/306* (2013.01); *B32B 27/308* (2013.01); *B32B 27/32* (2013.01); *B32B 27/36* (2013.01); *B32B 37/12* (2013.01); *C08K 3/016* (2018.01); *C08K 5/0066* (2013.01); *C09J 7/381* (2018.01); *E04D 12/002* (2013.01); *B32B 37/1284* (2013.01); *B32B 2037/1253* (2013.01); *B32B 2037/243* (2013.01); *B32B 2250/00* (2013.01); *B32B 2255/00* (2013.01); *B32B 2255/02* (2013.01); *B32B 2255/10* (2013.01); *B32B 2255/26* (2013.01); *B32B 2255/28* (2013.01); *B32B 2262/00* (2013.01); *B32B 2266/0214* (2013.01); *B32B 2266/0242* (2013.01); *B32B 2305/026* (2013.01); *B32B 2307/30* (2013.01); *B32B 2307/306* (2013.01); *B32B 2307/3065* (2013.01); *B32B 2307/40* (2013.01); *B32B 2307/71* (2013.01); *B32B 2307/724* (2013.01); *B32B 2307/7244* (2013.01); *B32B 2307/7248* (2013.01); *B32B 2307/7265* (2013.01); *B32B 2309/02* (2013.01); *B32B 2405/00* (2013.01); *B32B 2419/00* (2013.01); *B32B 2419/06* (2013.01); *B32B 2571/00* (2013.01); *B32B 2607/00* (2013.01); *B32B 2607/02* (2013.01); *Y10T 156/10* (2015.01); *Y10T 428/1452* (2015.01); *Y10T 428/249979* (2015.04); *Y10T 442/651* (2015.04)

(56) References Cited

U.S. PATENT DOCUMENTS

| | | |
|---|---|---|
| 3,445,272 A | 5/1969 | Newton, Jr. |
| 3,539,388 A | 11/1970 | Tu |
| 3,979,867 A | 9/1976 | Sowinksi |
| 4,098,044 A | 7/1978 | Slavik |
| 4,163,822 A | 8/1979 | Walter |
| 4,252,590 A | 2/1981 | Rasen et al. |
| 4,315,392 A | 2/1982 | Sylvest |
| 4,655,210 A * | 4/1987 | Edenbaum .......... A61F 13/0203 602/46 |
| 4,764,412 A | 8/1988 | Burns |
| 4,815,963 A | 3/1989 | Berkhout |
| 4,851,272 A | 7/1989 | Knox, III |
| 5,099,627 A | 3/1992 | Coulton et al. |
| 5,425,672 A | 6/1995 | Rotter |
| 5,598,673 A | 2/1997 | Atkins |
| 5,617,687 A | 4/1997 | Bussey, Jr. |
| 5,709,651 A | 1/1998 | Ward |
| 5,960,595 A | 10/1999 | McCorsley, III et al. |
| 5,973,015 A | 10/1999 | Coronado et al. |
| 5,993,927 A | 11/1999 | Sugita et al. |
| 6,131,353 A | 10/2000 | Egan |
| 6,284,368 B2 * | 9/2001 | Muta ............................ 428/345 |
| 6,316,016 B1 | 11/2001 | Iwakawa |
| 6,594,965 B2 | 7/2003 | Coulton |
| 6,804,922 B1 | 10/2004 | Egan |
| 6,927,267 B1 | 8/2005 | Varela de la Rosa |
| 6,938,383 B2 | 9/2005 | Morris et al. |
| 7,117,649 B2 | 10/2006 | Morris et al. |
| RE39,825 E | 9/2007 | Morris et al. |
| 7,488,523 B1 | 2/2009 | Muncaster |
| 7,617,638 B1 | 11/2009 | Slama et al. |
| 7,651,757 B2 | 1/2010 | Jones et al. |
| 8,146,310 B2 | 4/2012 | Keene |
| 8,245,472 B2 | 8/2012 | Keene |
| 8,387,336 B2 | 3/2013 | Coulton |
| 8,549,806 B2 | 10/2013 | Snyder |
| 8,590,267 B2 | 11/2013 | Jaffee |
| 2002/0146953 A1 | 10/2002 | Lubker, II |
| 2003/0232171 A1 | 12/2003 | Keith |
| 2004/0106346 A1 | 6/2004 | Zafiroglu |
| 2004/0180195 A1 | 9/2004 | Mucuga |
| 2004/0237464 A1 | 12/2004 | Khan |
| 2005/0000172 A1 | 1/2005 | Anderson |
| 2005/0014431 A1 | 1/2005 | Carmody et al. |
| 2005/0055983 A1 | 3/2005 | Tomes |
| 2005/0214496 A1 | 9/2005 | Borenstein |
| 2006/0096218 A1 | 5/2006 | Johnson |
| 2006/0101758 A1 | 5/2006 | Egan |
| 2006/0211781 A1 * | 9/2006 | Strandburg ............... C08J 9/30 521/74 |
| 2007/0212520 A1 | 9/2007 | Furumori et al. |
| 2008/0120935 A1 | 5/2008 | Lembo |
| 2008/0268224 A1 | 10/2008 | Kim |
| 2009/0047465 A1 | 2/2009 | Zafiroglu |
| 2009/0288358 A1 | 11/2009 | Snyder |
| 2011/0185666 A1 | 8/2011 | Russell |
| 2013/0052401 A1 | 2/2013 | Snyder |

FOREIGN PATENT DOCUMENTS

| | | |
|---|---|---|
| FI | 116226 B | 10/2005 |
| GB | 2473618 A | 3/2011 |
| JP | 07048554 A | 2/1995 |
| JP | 2001003025 A * | 1/2001 |
| MX | PA03001867 A | 6/2003 |
| WO | 2006047130 A1 | 11/2006 |
| WO | 2008067611 A1 | 6/2008 |
| WO | 2009127819 A1 | 10/2009 |
| WO | 2010056372 A1 | 5/2010 |

OTHER PUBLICATIONS

Translation of JP 2001-3025. See PTO 892 dated Jun. 1, 2016 for date and inventor.*
Cosella-Dorken Products, Inc. Technical Data Sheet for DELTA®-Fassade S and DELTA®-Fassade S Plus UV, Dec. 21, 2011.
Cosella-Dorken Products, Inc. Technical Data Sheet fro DELTA®-Vent S.
E.I. du Pont De Nemours and Company, "DuPont TYVEK® Providing Protection in Construction".

(56) References Cited

OTHER PUBLICATIONS

Irish Agreement Board, "DuPont TYVEK® SUPRO Vapour Permeable Roofing Underlays for Pitched Roofs", Certificate No. 04/0157, Nov. 2004.
British Board of Agreement TYVEK® SUPRO Roof Tile Underlayment for Use in Warm Non-Ventilated and Cold Ventilated Roofs, Certificate No. 08/4548, Apr. 8, 2008.

* cited by examiner

VAPOR PERMEABLE, WATER RESISTIVE, AIR BARRIER POLYESTER MEMBRANE HAVING A POLYACRYLIC COATING WITH POROUS PRESSURE SENSITIVE ADHESIVE ADDED TO THE REAR SURFACE OF THE MEMBRANE

CROSS-REFERENCE TO RELATED APPLICATIONS

This is a continuation-in-part patent application claiming priority and the benefits of U.S. patent application Ser. No. 14/121,027, filed Jul. 22, 2014, claiming priority from U.S. Provisional Patent Application No. 61/958,161, filed Jul. 22, 2013.

TECHNICAL FIELD OF THE INVENTION

The present invention relates generally to a water resistive, air barrier water vapor permeable building sheet or membrane which is fastened to the building by pressure sensitive adhesive which is coated on a surface of the building sheet.

BACKGROUND OF THE INVENTION

Architects and engineers agree that buildings must be able to breathe; however most commonly used building underlayments and membranes trap condensation and moisture in wall cavities which can lead to poor indoor air quality, energy deficiencies and costly building damage. The North American building industry spends around $9 billion dollars each year repairing and litigating building damages from water and moisture. New materials used in building construction over the last 20 years are energy efficient, but ventilation poor, resulting in toxic mold claims of over $3 billion dollars. Air leakage from such membranes can result in increased energy use of up to 30-40% in heating climates and 10-15% in cooling climates.

Proper building envelope design promotes continual drying by allowing vapor to escape. Moisture can penetrate a building envelope through materials and rain/snow exposure during construction. General occupancy also adds to the moisture levels. Trapped moisture can cause wood rot, swelling and distortion of lumber, corrosion of metal and reduction of insulation thermal value. Any or all of these issues result in a high risk of mold, mildew, building deterioration, poor indoor air quality and health and safety risks to the occupant. In some states, new air tightness and energy saving requirements increase the possibility of trapped moisture, when low or non-permeable air barriers are utilized.

Current building construction uses barrier sheets or membranes to form an envelope around the construction to allow the transport of moisture into and out of a building and to control the movement of air through a wall or roof covered by the barrier sheet. Common commercial barrier sheets or membranes are sold under the Henry Company and W.R. Grace & Co. brands. These and other commercial barrier sheets commonly use adhesive which is applied to the sheet so that the same can be secured to a wall or roof. Problems which occur in these commercial usages is that the adhesive used is not pressure sensitive or that the adhesive may not be porous to allow water vapor transmission.

It is well known to provide a planar carrier membrane with an adhesive application which is limited on the surface area or interrupted by adhesive free places. It is also well known to perforate the adhesive composition after placement on the planar carrier membrane with mechanical means or with the aid of air nozzles so that the entire surface of the planar carrier is perforated.

Medical dressings or sheets have used a porous adhesive coated over a substrate surface to allow air flow to reach the wound and allow moisture to be transmitted away from the wound. Examples of such dressings having pores formed in the pressure sensitive adhesive are described in U.S. Pat. No. 4,163,822 issued Aug. 7, 1979 and U.S. Pat. No. 5,709,651 issued Jan. 20, 1998. A porous adhesive for corrugated cardboard is disclosed in U.S. Patent Application Publication Number 2008/0268224 published Oct. 30, 2008. These sheets perform in the same manner as construction barrier sheets, albeit in a smaller surface application area with different substrates. A large surface construction barrier sheet using a vapor permeable adhesive is described in U.S. Patent Application Publication Number 2011/0018566 published on Aug. 4, 2011. The corresponding United States equivalent is U.S. patent application Ser. No. 12/937,823 filed Apr. 15, 2011.

Many construction barrier sheets currently in use are formulated to be weather resistant keeping out liquid and resisting wind pressure. These sheets are secured to building sheathing and form an "envelope" underneath exterior cladding or roofing. Some commercial barrier sheets are water vapor permeable but have limited pressure sensitive adhesive applied to specific areas of their inner surface. Thus, there exists a need for a highly water vapor permeable pressure sensitive adhesive which can be applied to the entire inner surface of the barrier sheet allowing it to be easily mounted to sheathing or the like. The present membrane has uniform vapor permeable characteristics with higher permeability over the surface of the barrier sheet with pores in the adhesive uniformly distributed to form a vapor flow path through the adhesive.

SUMMARY OF THE INVENTION

A breathable polyester membrane sheet having an integral polyacrylic coating and a coated pressure sensitive adhesive strip or covering coated on its back or inner surface capable of allowing increased amounts of moisture vapor to pass through it when the adhesive release liner is removed and the sheet is mounted to a building surface. The pressure sensitive adhesive applied to the polyester membrane is formed of a copolymer comprising a backbone of n-butyl acrylate, 2-ethylhexyl acrylate, and vinyl acetate which is mixed with a surfactant and emulsified in a foam mixer to produce a precisely homogenized mix of adhesive and air bubbles which form pores when the copolymer is set on the membrane. About 80% to about 90% of the pore sizes in the foamed adhesive range from about 200 microns to about 300 microns and the cured pressure sensitive adhesive has a pore density ranging from about 4200 per inch$^2$ to about 4600 per inch, with the pores being uniformly distributed and forming a flow path through the adhesive.

It is an object of the present invention to provide an ultra violet (UV) stable polyester membrane with a pressure sensitive adhesive which is porous with the pores being uniformly distributed and interconnected allowing vapor transmission through the adhesive and membrane.

It is another object of the invention to provide an ultra violet (UV) stable polyester membrane with a pressure sensitive adhesive covering the entire inner surface of the membrane which allows water vapor to be circulated through the adhesive.

It is yet another object of the invention to provide an ultra violet (UV) stable polyester pressure sensitive porous adhesive which has fire resistant capabilities.

These and other objects, advantages, and novel features of the present invention will become apparent when considered with the teachings contained in the detailed disclosure along with the accompanying drawings.

DETAILED DESCRIPTION OF THE INVENTION

The preferred embodiment and best mode of the invention is shown in FIGS. 1-5.

Figure 1:
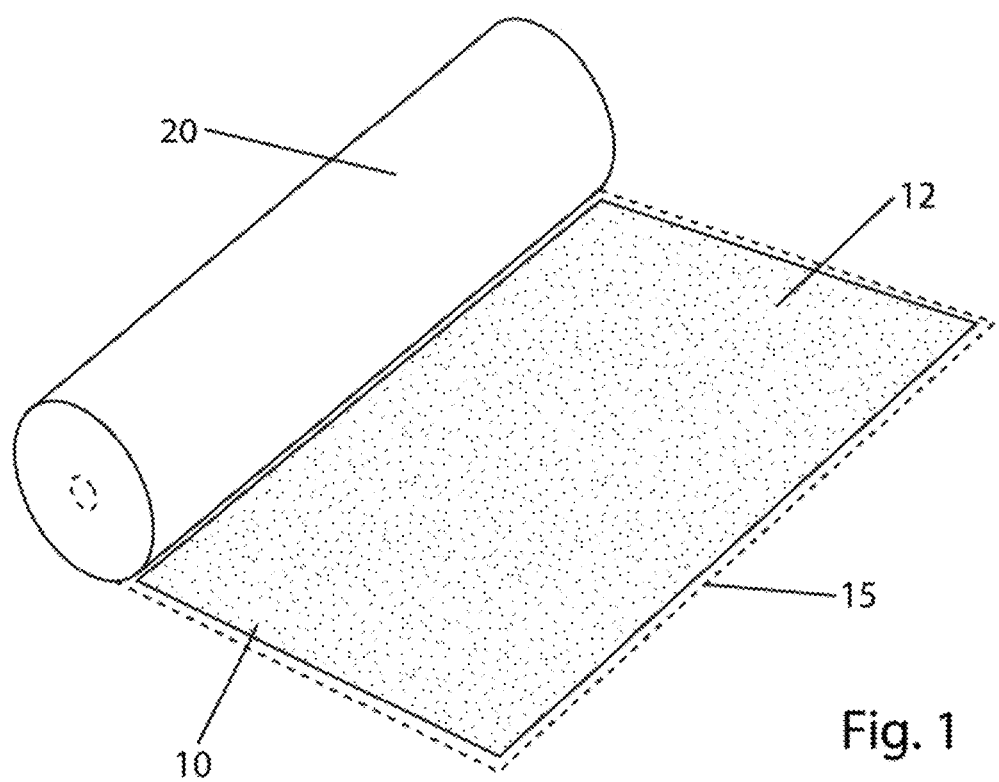
FIG. 1 is a perspective view of a roll of the inventive construction membrane.
Figure 2:
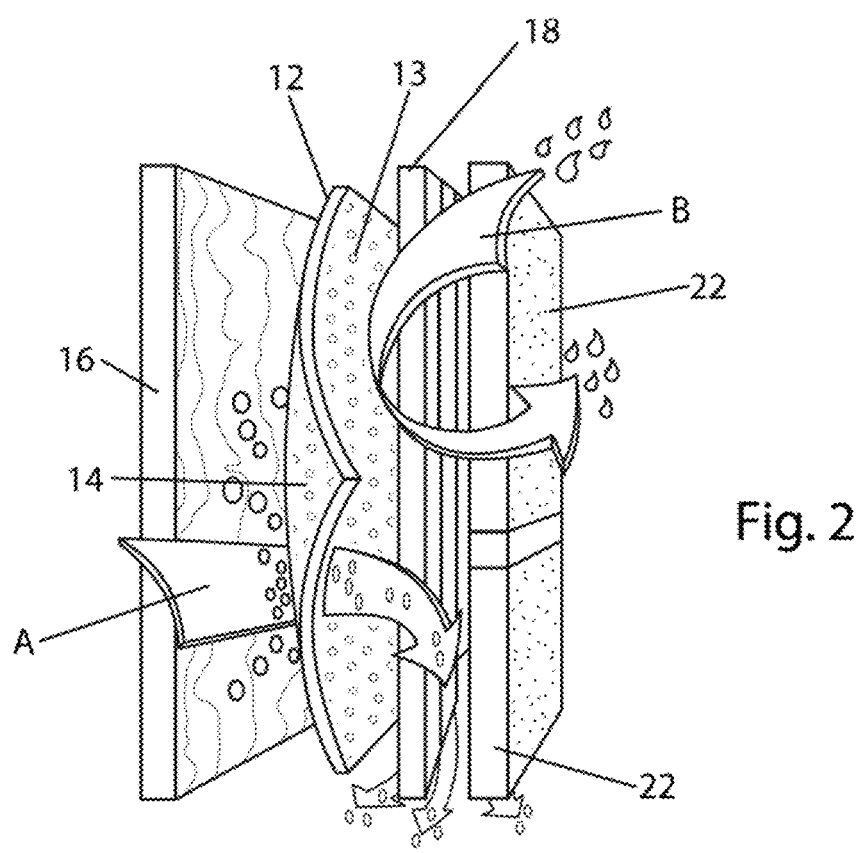
FIG. 2 is an enlarged partial broken apart cross sectional view of the construction membrane shown in FIG. 1 applied in a building construction environment.

A building construction membrane 10 in the form of a blank UV stable highly vapor permeable water resistive barrier, air barrier for open joint rain screen cladding system. UV stable means that it is applicable in all climates and sustains 180 days exposure to UV and climate prior to cladding installation. The inventive sheet 12 is constructed of a permeable polyester sheet with a polyacrylic coating 13 on its front face and has a layer of porous pressure sensitive adhesive 14 coated and set over a back portion of the sheet surface in the form of a strip or over the entire surface of the sheet. The composite sheet installs as a single layer black membrane and is particularly useful in connection with open joint rain screen cladding. It emits zero VOC's eliminating exposure to harmful and volatile chemicals. The surface of the adhesive is covered by a removable film cover or liner 15. When the release film liner 15 is removed, the back surface of membrane 12 with pressure sensitive adhesive 14 is mounted to a wall board or exterior sheathing or rigid insulation 16 which is secured to studs 17. As shown in FIG. 2, the outer face polyacrylic coating 13 is pressed against battens 18 which are secured to an open joint cladding 22. Air and vapor flow is shown by Arrows A and B, respectively.

The membrane 10 is produced as a roll of sheet material 20, preferably 165 feet in length and with a width of 58-60 inches, preferably 59 inches. The membrane 10 is ultra violet (UV) stable water resistant and has a water vapor transmission greater than 40 Perms, preferably ranging from about 40 to about 70 Perms and acts as an air barrier. The produced membrane is inert and can be recycled for reuse.

Figure 3:
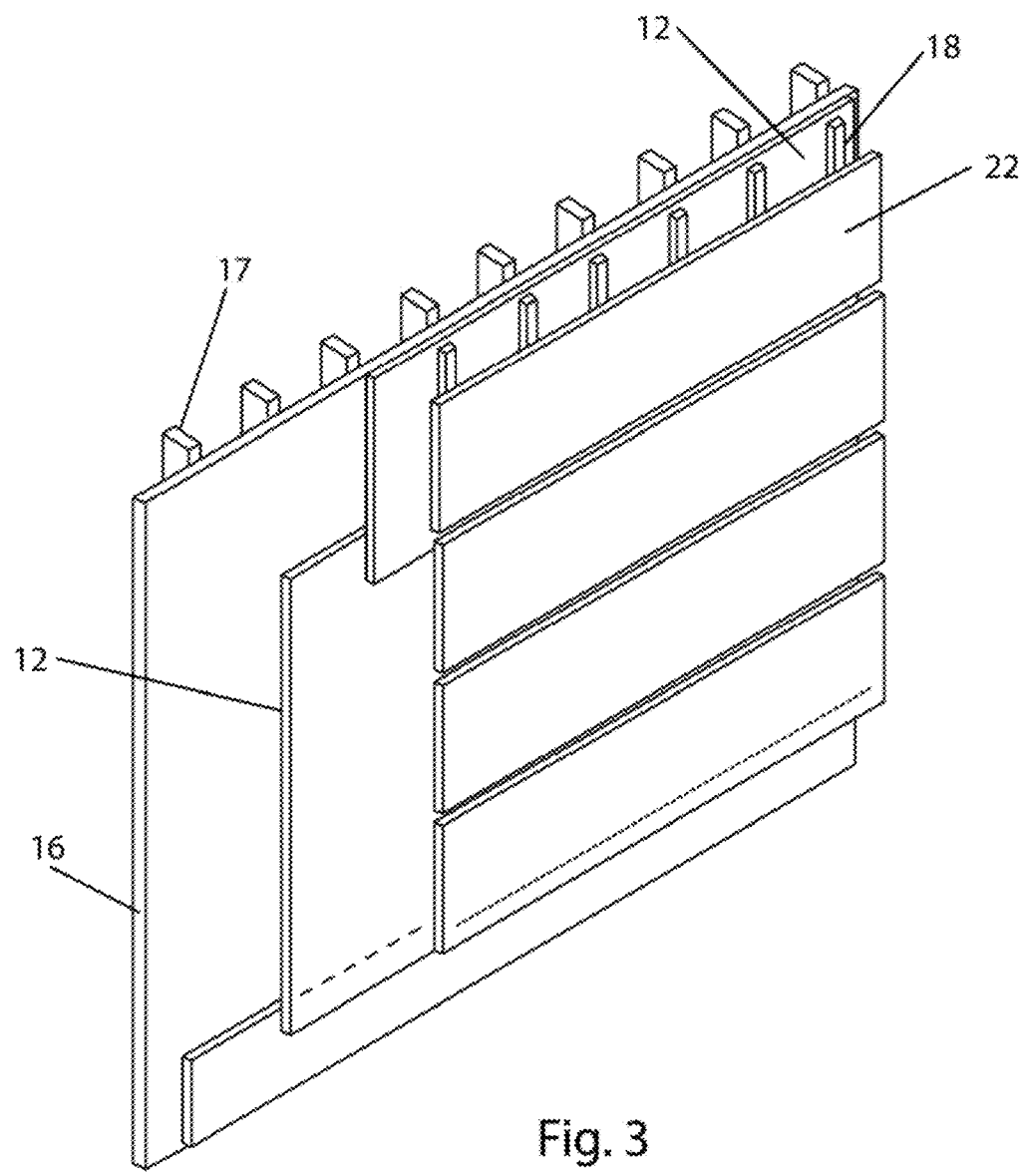
FIG. 3 is a side elevation view of a building construction using the present invention with components removed.
Figure 4:
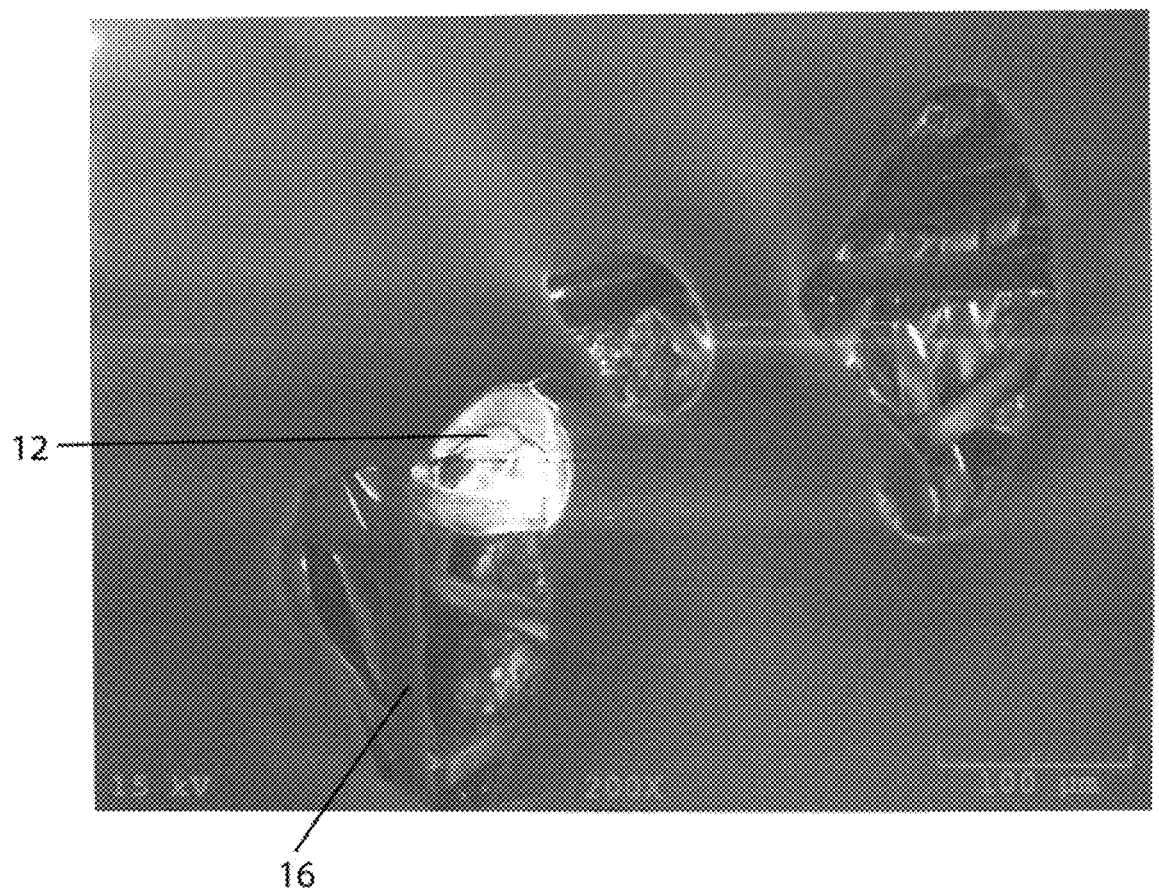
FIG. 4 is a scanning electron microscopy photograph of the porous adhesive used with the construction membrane at 50× magnification.

As shown in FIG. 3, an exterior sheeting or wall board 16 is mechanically fastened to studs 17 and the sheet 12 is adhesively secured to sheet 16. The sheet 12 may also be secured by the adhesive to rigid insulation or other wall substrates as gypsum sheathing. The open joint cladding 22 is fastened to the battens 18 by mechanical means.

The pressure sensitive porous adhesive 14 is coated and cured on the back of the polyester/polyacrylic liner sheet 12 to fix the pores in place. The composite structure of the present invention has a high vapor permeability (40 to 50 Perms) and the adhesive breathes allowing vapor to escape while being water resistant.

A Perm is a unit of water vapor transmission defined as 1 grain of water vapor per square foot per hour per inch of mercury pressure difference (1 inch mercury=0.49 psi). The metric unit of measure is ng/m2 s Pa. 1 perm=55 ng/m2 s Pa. Permeability is the time rate of water vapor transmission through unit area of a material of unit thickness induced by unit vapor pressure difference between two specific surfaces, under specified temperature and humidity conditions. Membranes with a higher Perm value greater than 20 reduce the risk of condensation and promote escape of moisture through the building envelope. Additionally, membranes with a high Perm value can help building materials dry-out during the construction phase.

The copolymer portion of the pressure sensitive adhesive (PSA) has a backbone consisting of n-butyl acrylate, 2-ethylhexyl acrylate, and vinyl acetate. The structure of the backbone is shown in Table I below as follows:

TABLE I (Structure of PSA Polymer Backbone)

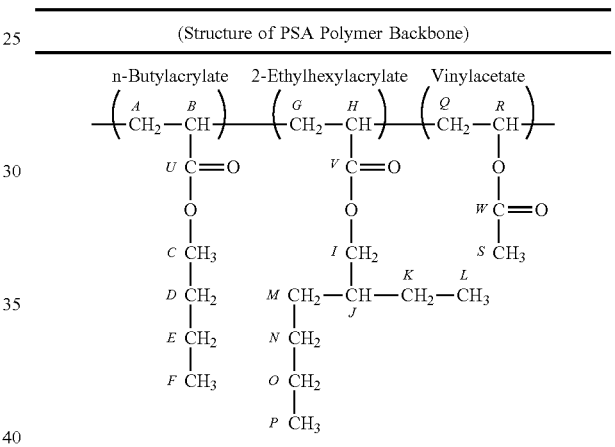

The adhesive fully bonds to almost any substitute for air tightness and ease of installation and requires no primer.

The pressure sensitive adhesive (PSA) is an acrylic solution and bonds to the sheet 12. The polymeric portion of the PSA makes up at least 95% of the adhesive formulation and has a copolymer backbone of n-butyl acrylate (about 60% by weight), 2-ethylhexyl acrylate (about 32% by weight) and vinyl acetate (about 7% by weight) forming a copolymer solvent blend capable of accepting water. Proper foaming of the adhesive is critical to good micropore formation. The aeration process includes high sheer mixing to entrain air in the mixed liquid solution. Once the proper foam level is produced, the adhesive needs to be coated on the membrane sheet and the micropores formed.

The coating method used with the present invention was a blade coater. This is a non-contact coating method and it does not crush or destroy the foam during coating. It should be noted that other coating methods such as Meyer rod, comma coating and pattern bar coating were attempted but found to be detrimental to suitable micropore formation. After coating, the adhesive must be heated to lock-in the micropore formation. The adhesive in the present invention was reformulated by adding surfactants and water to the copolymer to control bubble size, bubble density, viscosity, and stability of the copolymer. The peel value of the adhesive is reduced by the introduction of voids (air bubbles) and the addition of surfactant such as long chain alcohols create a stable inverse emulsion. The peel value of the presently formulated adhesive during testing using dynamic peel data from stainless steel (Peel Adhesion ASTM D-3330) was about 25 oz. in at 1 minute; 27.5 oz. in at 10 minutes and 36.5 oz. in at 24 hours.

Figure 5:
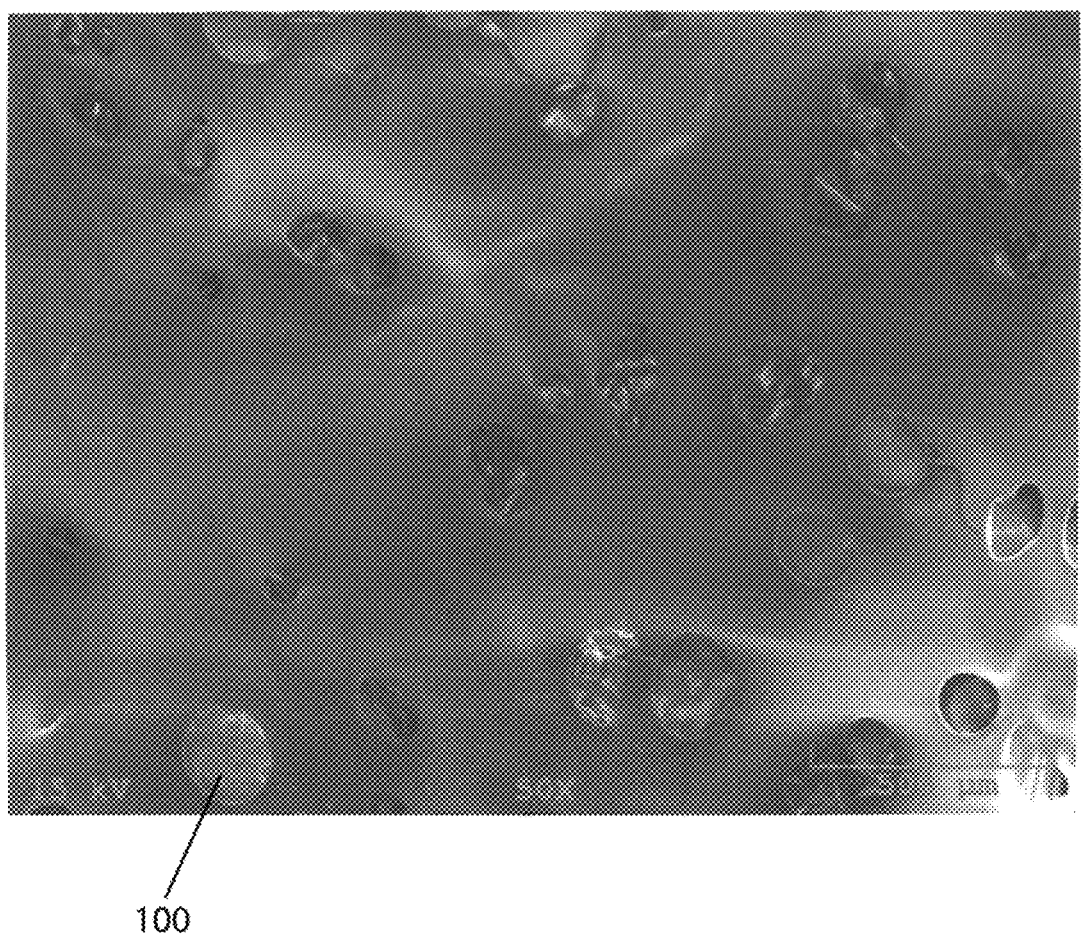
FIG. 5 is a scanning electron microscopy photograph of the porous adhesive used with the construction membrane at 200× magnification.

Microscopy of the modified adhesive surface was performed revealing a porous structure of the inventive adhesive having a bubble density (number of pores) ranging from about 4000 pores in 1.0 in$^2$ to about 4600 pores in 1.0 in$^2$, preferably about 4400 pores in 1.0 in$^2$ with a majority of the pores, preferably about 80% to about 90% of the bubbles/pores having a size ranging from about 200 microns to about 300 microns. See FIGS. 4 and 5. The pores formed are generally round and oval in shape and form a vapor pathway through the adhesive layer. The majority of the pores 100 formed by the entrained air bubbles appear to be distributed evenly across the surface penetrating through the adhesive layer when the polymer mixture is heat treated to set or cure the pores in the adhesive. The pore distribution is shown in FIG. 5. Preferably, the density of the foamed adhesive should fall between about 0.65 and about 0.75 after aeration.

The reformatted PSA was manufactured as follows:

The adhesive copolymer as shown in Table I ranged from about 45% by weight to about 50% by weight, preferably about 48% to about 49% by weight. The copolymer was mixed with a first solvent-free, surfactant-based wetting agent, preferably ranging from about 4% by weight to about 6% by weight, and most preferably about 5% by weight to provide emulsification and bubble size; and a second surfactant such as a foaming agent ranging from about 1.5% by weight to about 2.0% by weight, and preferably about 1.7% by weight to provide foam formation. A polymeric based water thickener was added to the mixture in a range from about 0.2% by weight to about 0.4% by weight, preferably about 0.30% by weight. The composition was added to water ranging from about 40% by weight to about 50% by weight, preferably about 43% by weight to about 45% by weight and mixed in a high speed dispersion mixer at 500 rpm to form uniform bubbles in the mixture and fed into a coater feeder as previously described. The foamed adhesive was coated onto a porous polyacrylic coated polyester liner sheet and heat cured to form an adhesive laminate with pores in place. The resultant foamed adhesive had average MVTR (g/m$^2$ day) of about 500 with a Peel adh @1800 (measured stability) ranging from about 65 to IS, preferably about 40.

The pressure sensitive porous adhesive construction membrane is preferably made by adding a coating of adhesive as a strip on the liner sheet with the composition of the adhesive noted above. If desired, as a building covering membrane, the entire rear surface of the sheet can be covered with the porous adhesive.

In a modified version, a flame retardant material Antimony Oxide was added to the adhesive mixture at about 2% by weight to about 3% by weight. Other flame retardant materials suitable for use with the adhesive may include halogenated fire suppressants, hydrated inorganic compounds such as aluminum trihydrate, magnesium hydroxide, calcium borate and zinc borate, intumescent phosphate, ammonium polyphosphate, organic and inorganic phosphate compounds such as ammonium sulfate, sulfamate compounds and free radical scavenger materials such as antimony trioxide.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A water resistive building membrane comprising:
   at least one permeable polyester plastic sheet having a front face,
   a polyacrylic coating coating the sheet's front face,
   a coating of permeable pressure sensitive acrylic; adhesive applied to an outer surface of the sheet opposite the sheet's front face, wherein the permeable pressure sensitive acrylic; adhesive comprises:
      at least 4000 entrained interconnected pores per square inch of adhesive, of which at least 80% of the pores have a size ranging from about 200 microns to about 300 microns, the pores being uniformly distributed and interconnected throughout the adhesive to form a water resistive water vapor flow path through the adhesive such that the adhesive has a vapor permeability of at least 40 Perms, and
      a copolymer with a backbone of n-butyl acrylate, 2-ethylhexyl acrylate, and vinyl acetate.

2. A water resistive building membrane as claimed in claim 1 wherein the pressure sensitive porous adhesive has a vapor permeability ranging from 40 to 70 Perms.

3. A water resistive building membrane as claimed in claim 1 wherein said pressure sensitive adhesive has a density ranging between about 0.65 to about 0.75.

4. A water resistive building membrane as claimed in claim 1 wherein said pressure sensitive adhesive has a pore density which ranges from 4000 per in$^2$ to about 4600 per in$^2$.

5. A water resistive building membrane as claimed in claim 1 wherein said pressure sensitive adhesive has a pore density of about 4400 per in$^2$.

6. A water resistive building membrane as claimed in claim 1 wherein said pressure sensitive adhesive contains a flame-retardant material.

7. A water resistive building membrane as claimed in claim 6 wherein said flame retardant material is Antimony Oxide.

8. A water resistive building membrane as claimed in claim 6 wherein said flame retardant material is taken from a group consisting of halogenated fire suppressants, hydrated inorganic compounds selected from one of the following aluminum trihydrate, magnesium hydroxide, calcium borate and zinc borate, intumescent phosphate, ammonium polyphosphate, organic and inorganic phosphate compounds selected from one of the following ammonium sulfate, sulfamate compounds and free radical scavenger materials.

9. A water resistive building membrane as claimed in claim 6 wherein said flame retardant material is present in said pressure sensitive adhesive in a range of about 0.5% by weight to about 3% by weight.

10. A water resistive building membrane as claimed in claim 6 wherein said pressure sensitive adhesive contains a flame-retardant material in a range of about 2% by weight to about 3% by weight.

11. A water resistive building membrane comprising:
    a permeable polyester sheet with a polyacrylic coating, and a coating of permeable pressure sensitive adhesive applied to an outer surface of the sheet, wherein the permeable pressure sensitive acrylic adhesive comprises:
- at least 4000 entrained interconnected pores per square inch of adhesive, of which at least 80% of the pores have a size ranging from about 200 microns to about 300 microns, the pores having a rounded shape and being uniformly distributed and interconnected throughout the adhesive to form a water resistive water vapor flow path through the adhesive, and
- a copolymer with a backbone of n-butyl acrylate, 2-ethylhexyl acrylate, and vinyl acetate.

12. A water resistive building membrane as claimed in claim 11 wherein said pressure sensitive adhesive contains a flame-retardant material.

13. A water resistive building membrane as claimed in claim 11 wherein a release liner is placed on said pressure sensitive adhesive material.

14. A water resistive membrane as claimed in claim 11 wherein said pressure sensitive adhesive has a density ranging between about 0.65 and about 0.75 after aeration.

15. The membrane of claim 11 wherein the permeable pressure sensitive acrylic adhesive has a vapor permeability of at least 40 Perms.

\* \* \* \* \*